United States Patent
Hadfield et al.

(10) Patent No.: US 11,172,009 B2
(45) Date of Patent: Nov. 9, 2021

(54) SYSTEM AND METHOD FOR FILTERING DATA STREAMS

(71) Applicant: International Business Machines Corporation, Armonk, NY (US)

(72) Inventors: Matthew Hadfield, Cambridge (GB); Ariana Hlavaty, Cambridge (GB); David Hlavaty, Cambridge (GB)

(73) Assignee: International Business Machines Corporation, Armonk, NY (US)

( * ) Notice: Subject to any disclaimer, the term of this patent is extended or adjusted under 35 U.S.C. 154(b) by 60 days.

(21) Appl. No.: 15/860,895

(22) Filed: Jan. 3, 2018

(65) Prior Publication Data

US 2019/0207999 A1    Jul. 4, 2019

(51) Int. Cl.
*H04L 29/06* (2006.01)
*H04L 29/08* (2006.01)

(52) U.S. Cl.
CPC ........ *H04L 65/605* (2013.01); *H04L 65/4069* (2013.01); *H04L 65/4084* (2013.01); *H04L 67/12* (2013.01); *H04L 67/18* (2013.01)

(58) Field of Classification Search
CPC .............. H04N 21/4532; H04L 65/605; H04L 65/4069; H04L 65/4084; H04L 67/12; H04L 67/18
See application file for complete search history.

(56) References Cited

U.S. PATENT DOCUMENTS

| | | | |
|---|---|---|---|
| 6,282,362 B1 | 8/2001 | Murphy et al. | |
| 8,045,749 B2 | 10/2011 | Rhoads et al. | |
| 8,744,230 B2 | 6/2014 | Hovagim et al. | |
| 9,207,065 B2 | 5/2015 | Earle | |
| 9,214,191 B2 | 12/2015 | Guzik | |
| 9,227,568 B1* | 1/2016 | Hubbell | B60R 1/06 |
| 9,268,837 B2 | 2/2016 | Hodge et al. | |
| 2002/0170068 A1* | 11/2002 | Rafey | H04N 21/458 725/112 |
| 2009/0093259 A1* | 4/2009 | Edge | H04W 4/029 455/456.3 |
| 2009/0158313 A1* | 6/2009 | Card, II | H04N 21/4524 725/28 |
| 2013/0117781 A1* | 5/2013 | Kim | H04N 21/431 725/32 |
| 2014/0022108 A1* | 1/2014 | Alberth, Jr. | G01S 13/931 342/52 |
| 2014/0049695 A1* | 2/2014 | Papish | H04N 21/44204 348/731 |
| 2014/0266637 A1* | 9/2014 | Alsina | G05B 15/02 340/12.26 |

(Continued)

OTHER PUBLICATIONS

Maggs, "New Virtual Windshield Lets You See Through Vehicles," Oct. 20, 2013, 1-5.

(Continued)

*Primary Examiner* — Andrew C Georgandellis

(74) *Attorney, Agent, or Firm* — Grant Johnson

(57) ABSTRACT

A method, computer program product, and computing system device for receiving a data stream encoded with metadata. Client data may also be received. At least a portion of the data stream may be filtered based upon, at least in part, a comparison of the metadata encoded into the video stream and the client data.

11 Claims, 8 Drawing Sheets

(56) References Cited

U.S. PATENT DOCUMENTS

2015/0266421 A1    9/2015  Brubaker
2017/0013296 A1*  1/2017  Millar .............. H04N 21/23439

OTHER PUBLICATIONS

Samsung, "The Safety Truck Could Revolutionize Road Safety," https://news.samsung.com/global/the-safety-truck-could-revolutionize-road-safety, downloaded on Sep. 13, 2017, dated Jun. 18, 2015, pp. 1-3.

Zhang et al., "Efficient Selective Frame Discard Algorithms for Stored Video Delivery Across Resource Constrained Networks," Real-Time Imaging 7, 255-273 (2001) doi:10.1006/rtim.2001,0226, available online at http://www.idealibrary.com on Ideal. pp. 255-273.

Lewis et al., "Software Algorithm for Decoding GPS From Spatially Encoded Video," Fields of Study, Real-Time Computing, https://academic.microsoft.com/ downloaded on Sep. 13, 2017, Jan. 1, 2007, pp. 1-2.

"ArcGIS Full Motion Video, Analyze and Manage Georeferenced Video Data in your Maps," http://www.esri.com/products/arcgis-capabilities/imagery/full-motion-video, downloaded on Sep. 13, 2017, pp. 1-3.

* cited by examiner

314

SYSTEM AND METHOD FOR FILTERING DATA STREAMS

BACKGROUND

Data streaming is very common today. Specifically, video streaming and audio streaming are used daily by millions of people during video calls, watching movies on demand, by law enforcement agencies to monitor and analyze security risks, and so on. As new applications are being invented, additional processing and filtering of the video may be required. For example, for online streaming, a data stream may be filtered by a server to reduce overall bandwidth. As new applications of data streaming are introduced, new ways to filter data streams may be needed.

BRIEF SUMMARY OF DISCLOSURE

In one example implementation, a computer-implemented method is executed on a computing device and may include but is not limited to receiving a data stream encoded with metadata. Client data may also be received. At least a portion of the data stream may be filtered based upon, at least in part, a comparison of the metadata encoded into the data stream and the client data.

One or more of the following example features may be included. One or more of the metadata encoded into the data stream and the client data may include location-based data. One or more of the metadata encoded into the data stream and the client data may include temporal data. The data stream may be one or more of a video stream and an audio stream. Filtering the at least one portion of the data stream may include filtering one or more frames from one or more of the video stream and the audio stream. Filtering the at least one portion of the data stream may include determining whether the comparison of the metadata encoded into the data stream and the client data meets one or more conditions. Filtering the at least one portion of the data stream may include determining whether the comparison of the metadata encoded into the data stream and the client data meets the one or more conditions for at least a minimum duration.

In another example implementation, a computer program product resides on a non-transitory computer readable medium that has a plurality of instructions stored on it. When executed across one or more processors, the plurality of instructions cause at least a portion of the one or more processors to perform operations that may include but are not limited to receiving a data stream encoded with metadata. Client data may also be received. At least a portion of the data stream may be filtered based upon, at least in part, a comparison of the metadata encoded into the data stream and the client data.

One or more of the following example features may be included. One or more of the metadata encoded into the data stream and the client data may include location-based data. One or more of the metadata encoded into the data stream and the client data may include temporal data. The data stream may be one or more of a video stream and an audio stream. Filtering the at least one portion of the data stream may include filtering one or more frames from one or more of the video stream and the audio stream. Filtering the at least one portion of the data stream may include determining whether the comparison of the metadata encoded into the data stream and the client data meets one or more conditions. Filtering the at least one portion of the data stream may include determining whether the comparison of the metadata encoded into the data stream and the client data meets the one or more conditions for at least a minimum duration.

In another example implementation, a computing system may include one or more processors and one or more memories, wherein the computing system is configured to perform operations that may include but are not limited to receiving a data stream encoded with metadata. Client data may also be received. At least a portion of the data stream may be filtered based upon, at least in part, a comparison of the metadata encoded into the data stream and the client data.

One or more of the following example features may be included. One or more of the metadata encoded into the data stream and the client data may include location-based data. One or more of the metadata encoded into the data stream and the client data may include temporal data. The data stream may be one or more of a video stream and an audio stream. Filtering the at least one portion of the data stream may include filtering one or more frames from one or more of the video stream and the audio stream. Filtering the at least one portion of the data stream may include determining whether the comparison of the metadata encoded into the data stream and the client data meets one or more conditions. Filtering the at least one portion of the data stream may include determining whether the comparison of the metadata encoded into the data stream and the client data meets the one or more conditions for at least a minimum duration.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE SEVERAL VIEWS OF THE DRAWINGS

Like reference symbols in the various drawings indicate like elements.

DETAILED DESCRIPTION

Figure 1:
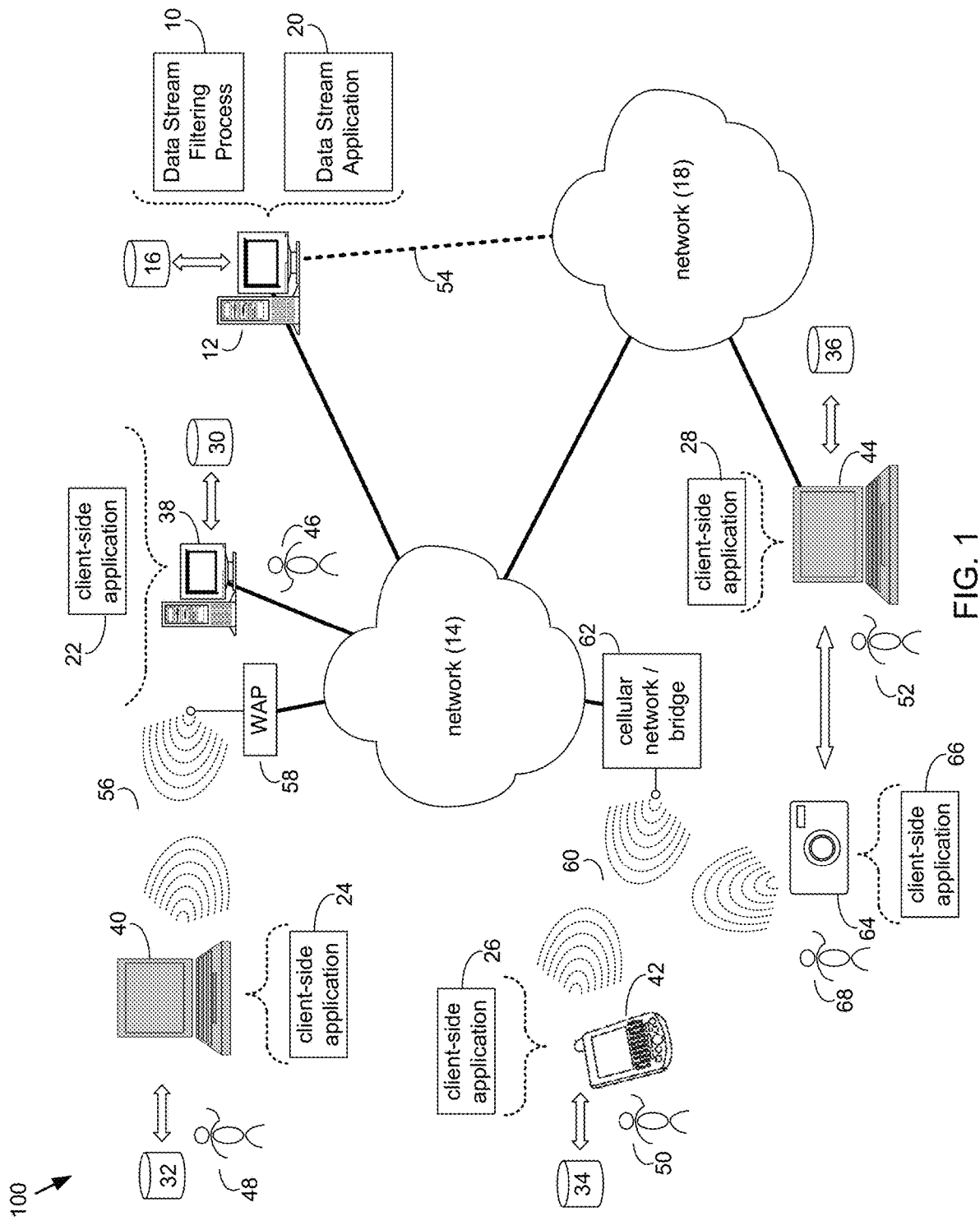
FIG. 1 is an example diagrammatic view of data stream filtering process coupled to a distributed computing network according to one or more example implementations of the disclosure.
Figure 2:
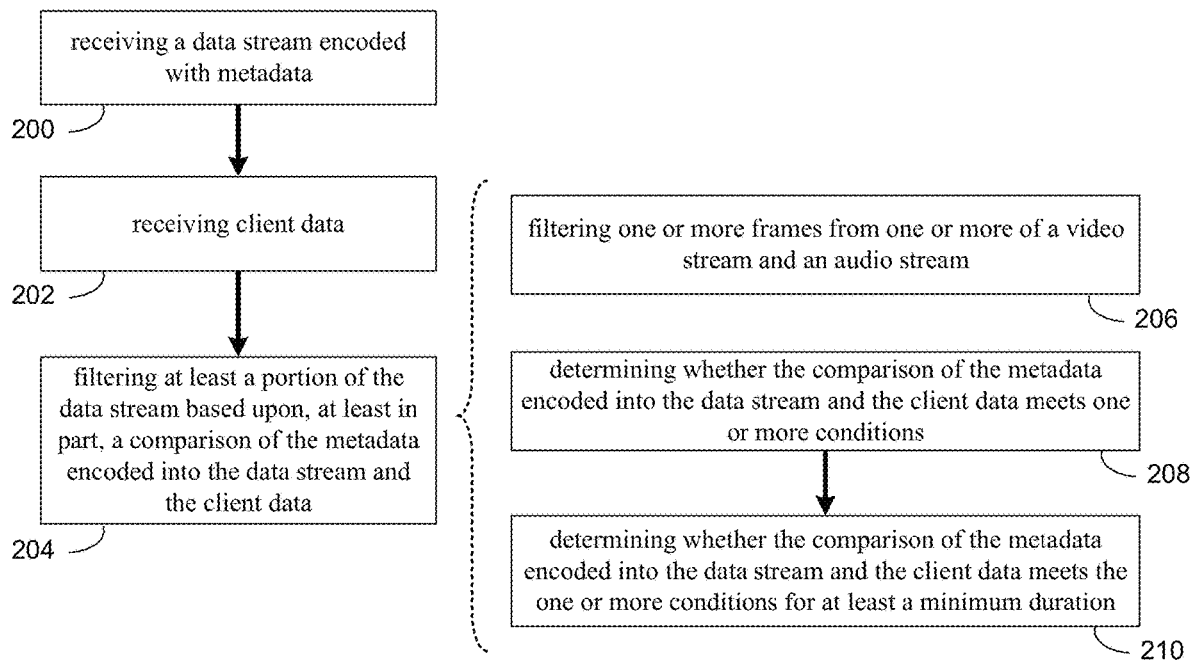
FIG. 2 is an example flowchart of the data stream filtering process of FIG. 1 according to one or more example implementations of the disclosure.
Figure 3:
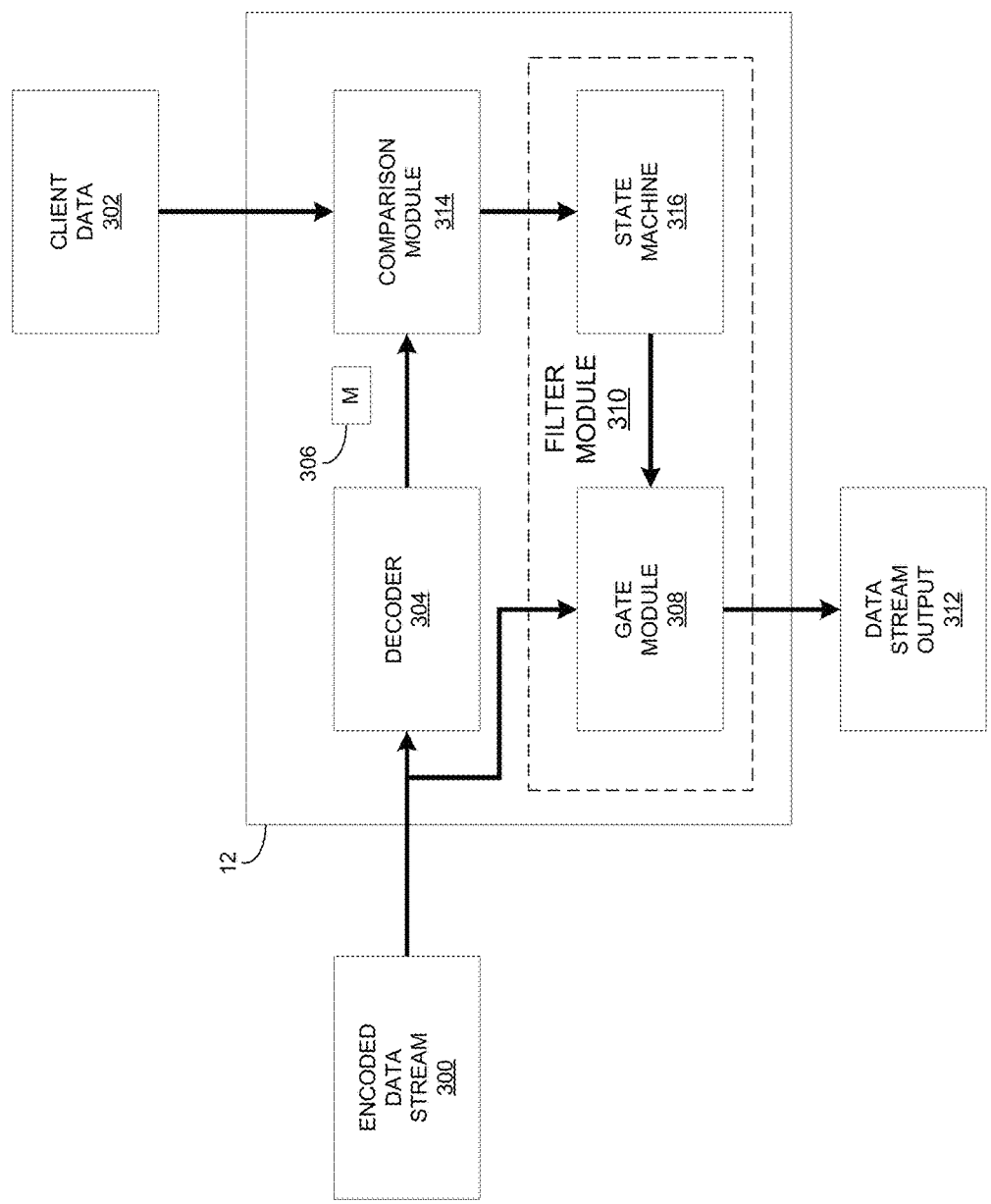
FIG. 3 is an example diagrammatic view of a data stream filtering device of the data stream filtering process of FIG. 1 according to one or more example implementations of the disclosure.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to FIG. 1, there is shown data stream filtering process 10 that may reside on and may be executed by a computing device 12, which may be connected to a network (e.g., network 14) (e.g., the internet or a local area network). Examples of computing device 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Computing device 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations and as will be discussed in greater detail below, computing device 12 may include or may be a data stream filtering device (e.g., data stream filtering device 12). In some implementations, the data stream filtering device (e.g., data stream filtering device 12) may include a decoder, a comparison module, and a filtering module. In some implementations, the filtering module may include a state machine and/or a gate module. As will be appreciated by one having skill in the art, embodiments of the data stream filtering device and/or components of the data stream filtering device may take the form of an entirely hardware embodiment, an entirely software embodiment (including firmware, resident software, micro-code, etc.) or an embodiment combining software and hardware.

As will be discussed below in greater detail, a data stream filtering process, such as data stream filtering process 10 of FIG. 1, may receive a data stream encoded with metadata. Client data may also be received. At least a portion of the data stream may be filtered based upon, at least in part, a comparison of the metadata encoded into the video stream and the client data.

The instruction sets and subroutines of data stream filtering process 10, which may be stored on storage device 16 coupled to computing device 12, may be executed by one or more processors (not shown) and one or more memory architectures (not shown) included within computing device 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Data stream filtering process 10 may be a stand-alone application that interfaces with an applet/application that is accessed via client applications 22, 24, 26, 28, 66. In some embodiments, data stream filtering process 10 may be, in whole or in part, distributed in a cloud computing topology. In this way, computing device 12 and storage device 16 may refer to multiple devices, which may also be distributed throughout network 14 and/or network 18.

Computing device 12 may execute a data streaming application (e.g., data streaming application 20), examples of which may include, but are not limited to, applications that provide streaming content to a user. For example, data streaming applications may include web applications, video streaming applications, audio streaming applications, file-sharing applications, real-time data sharing applications, etc. Data stream filtering process 10 and/or data streaming application 20 may be accessed via client applications 22, 24, 26, 28, 66. Data stream filtering process 10 may be a stand-alone application, or may be an applet/application/script/extension that may interact with and/or be executed within data streaming application 20, a component of data streaming application 20, and/or one or more of client applications 22, 24, 26, 28, 66. Data streaming application 20 may be a stand-alone application, or may be an applet/application/script/extension that may interact with and/or be executed within data stream filtering process 10, a component of data stream filtering process 10, and/or one or more of client applications 22, 24, 26, 28, 66. One or more of client applications 22, 24, 26, 28, 66 may be a stand-alone application, or may be an applet/application/script/extension that may interact with and/or be executed within and/or be a component of data stream filtering process 10 and/or data streaming application 20. Examples of client applications 22, 24, 26, 28, 66 may include, but are not limited to, applications that receive queries to search for content from one or more databases, servers, cloud storage servers, etc., a textual and/or a graphical user interface, a customized web browser, a plugin, an Application Programming Interface (API), or a custom application. The instruction sets and subroutines of client applications 22, 24, 26, 28, 66 which may be stored on storage devices 30, 32, 34, 36, coupled to client electronic devices 38, 40, 42, 44, and/or camera system 64 may be executed by one or more processors (not shown) and one or more memory architectures (not shown) incorporated into client electronic devices 38, 40, 42, 44.

Storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computing device 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet (not shown), a server (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Microsoft® Windows®; Mac® OS X®; Red Hat® Linux®, Windows® Mobile, Chrome OS, Blackberry OS, Fire OS, or a custom operating system.

One or more of client applications 22, 24, 26, 28, 66 may be configured to effectuate some or all of the functionality of data stream filtering process 10 (and vice versa). Accordingly, data stream filtering process 10 may be a purely server-side application, a purely client-side application, or a hybrid server-side/client-side application that is cooperatively executed by one or more of client applications 22, 24, 26, 28, 66 and/or data stream filtering process 10.

One or more of client applications 22, 24, 26, 28, may be configured to effectuate some or all of the functionality of data streaming application 20 (and vice versa). Accordingly, data streaming application 20 may be a purely server-side application, a purely client-side application, or a hybrid server-side/client-side application that is cooperatively executed by one or more of client applications 22, 24, 26, 28 and/or data streaming application 20. As one or more of client applications 22, 24, 26, 28, data stream filtering process 10, and data streaming application 20, taken singly or in any combination, may effectuate some or all of the same functionality, any description of effectuating such functionality via one or more of client applications 22, 24, 26, 28, data stream filtering process 10, data streaming application 20, or combination thereof, and any described interaction(s) between one or more of client applications 22, 24, 26, 28, data stream filtering process 10, data streaming application 20, or combination thereof to effectuate such functionality, should be taken as an example only and not to limit the scope of the disclosure.

Users 46, 48, 50, 52 may access computing device 12 and data stream filtering process 10 (e.g., using one or more of client electronic devices 38, 40, 42, 44) directly or indirectly through network 14 or through secondary network 18. Further, computing device 12 may be connected to network 14 through secondary network 18, as illustrated with phantom link line 54. Data stream filtering process 10 may include one or more user interfaces, such as browsers and textual or graphical user interfaces, through which users 46, 48, 50, 52 may access data stream filtering process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 800.11a, 800.11b, 800.11g, Wi-Fi®, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

Some or all of the IEEE 800.11x specifications may use Ethernet protocol and carrier sense multiple access with collision avoidance (i.e., CSMA/CA) for path sharing. The various 800.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

As discussed above and referring also at least to FIGS. 2-8, data stream filtering process 10 may receive 200 a data stream encoded with metadata. Client data may also be received 202. At least a portion of the data stream may be filtered 204 based upon, at least in part, a comparison of the metadata encoded into the data stream and the client data.

In some implementations consistent with the present disclosure, systems and methods may be provided for frame-by-frame filtering of a data stream (e.g., a video stream and/or an audio stream) based upon, at least in part, metadata encoded in the data stream. In some implementations, data stream filtering process 10 may filter at least a portion (e.g., plurality of frames) of a data stream based upon, at least in part, metadata embedded or encoded into the data stream. In this way, data stream filtering process 10 may determine if the data stream content is relevant and whether or not it should be filtered (e.g., removed from the data stream and/or otherwise not provided to a recipient) or provided to a client device. For example, many drivers get stuck behind other vehicles (e.g., a leading vehicle) on the road such as large trucks, vans, construction vehicles, etc. Overtaking or passing such a vehicle may be very stressful as the leading vehicle may obstruct the driver's vision, which makes it difficult to assess whether it is safe to overtake. The longer it takes to overtake, the more likely it is the driver will become impatient and perform rash maneuver, endangering themselves and everyone else around. In some implementations of the present disclosure, a camera or camera system may be associated with the leading vehicle and may be configured to capture what lies ahead of the leading vehicle. A video stream from the camera system of the leading vehicle may be broadcast to surrounding and/or following vehicles. This broadcast video stream may be viewed by an operator of a nearby vehicle (such as a following vehicle) who may be considering passing the leading vehicle. This broadcast video stream may be viewed by the operator of the nearby vehicle in a variety of manners. For example, many vehicles may have a means for displaying video, whether it is through an in-car display, a navigation system, a parking camera, a smart phone, etc.

As such, the leading vehicle may transmit a video stream from a vehicle-mounted camera system that may be received and displayed by following vehicles. The transmission may happen via a short distance wireless communication and/or via an Internet connection. To ensure that the video is up-to-date and relevant at the time it is displayed in the following vehicle, data stream filtering process 10 may compare metadata encoded in the data stream to client data and may filter or block at least a portion (e.g., one or more frames) of the video stream when one or more conditions for displaying the video are not met (e.g., the following vehicle is out of range of the leading vehicle, the following vehicle is not behind the leading vehicle, etc.). If the conditions are met for displaying the video stream, the video stream may be output to the following vehicle's display. This may allow the display of, or within, the following vehicle to show an up-to-date video stream to the driver and the driver can use this data to judge what to do next. It will be appreciated that filtering of a data stream based upon, at least in part, a comparison of the content of the data stream and client data may be utilized in various applications other than vehicle-based camera systems.

As generally discussed above with reference to FIGS. 2 and 3, data stream filtering process 10 may receive 200 a data stream encoded with metadata. A data stream (e.g., data stream 300) may generally include a transmission (e.g., wired, wireless, etc.) of data. In some implementations, the data stream (e.g., data stream 300) may include a flow of data from a source device to at least one destination device. In some implementations, the data stream (e.g., data stream 300) may include one or more portions of data (e.g., frames, bits, bytes, blocks, tracks, etc.). In some implementations, the data stream (e.g., data stream 300) may be received from a source computing device (e.g., client electronic device 38). In some implementations, a data stream may include pre-recorded content and/or real-time content. For example, the data stream (e.g., data stream 300) may include a video stream that was recorded by a camera system (e.g., camera system 64) and subsequently transmitted (e.g., not in real-time). In some implementations, the data stream may include real-time content. For example, the data stream may include a video stream that was recorded by a camera system (e.g., camera system 64) and transmitted in real-time. In some implementations, data stream filtering process 10 may receive a real-time video stream from a vehicle-mounted camera system (e.g., camera system 64).

In some implementations, the data stream (e.g., data stream 300) may be one or more of a video stream and an audio stream. In some implementations, the video stream may include a plurality of frames (e.g., frames of a video). Data stream filtering process 10 may receive the video stream from a camera system (e.g., camera system 64). For example, a camera system (e.g., camera system 64) may record a video (e.g., a plurality of frames or images) using one or more cameras of the camera system.

Figure 4:
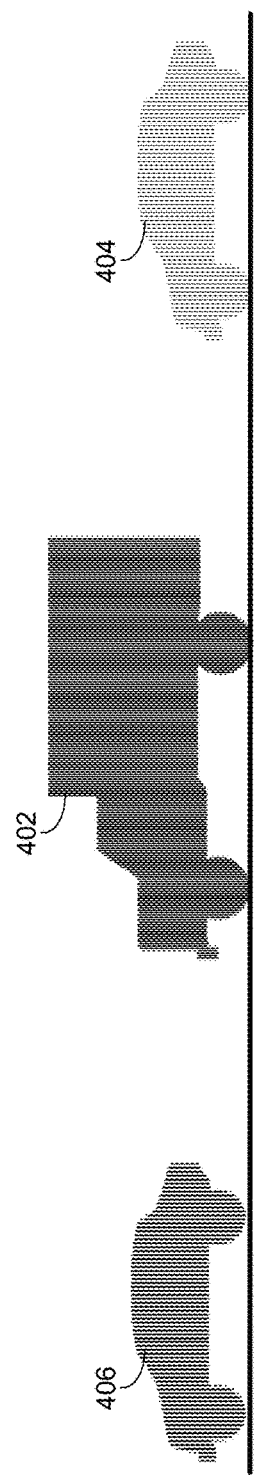
FIG. 4 is an example diagrammatic view of a vehicular application according to one or more example implementations of the disclosure.

Referring also to FIG. 4 and in some implementations, the camera system may be a vehicle-mounted camera system. For example, the camera system may be mounted in and/or on a first vehicle (e.g., first vehicle 402) and may be configured to record one or more perspectives of the vehicle. For example, the first vehicle (e.g., first vehicle 402) may have a forward-facing camera to view the area in front of the (e.g., first vehicle 402), a rear-facing camera to view the area behind the (e.g., first vehicle 402), and one or more side-view cameras to view either side of the (e.g., first vehicle 402). In some implementations, a camera system (e.g., camera system 64) may transmit a video stream (e.g., by broadcasting the video stream from a transmitter, and/or by broadcasting the video stream via a network-connected computing device electronically coupled to the camera system).

In some implementations, a second vehicle (e.g., second vehicle 404) may receive (e.g., via data stream filtering process 10) a video stream transmitted from the first vehicle. For example, the second vehicle (e.g., second vehicle 404) may be following the first vehicle (e.g., first vehicle 402) and may display the video stream (e.g., via data stream filtering process 10 and on a display within the second vehicle) to see the view(s) of the one or more cameras of the camera system of the first vehicle (e.g., first vehicle 402). As will be discussed in greater detail below, the driver of the second vehicle (e.g., second vehicle 404) may use the video stream to help make driving decisions (e.g., whether to overtake the first vehicle, how closely to follow the first vehicle, what obstacles to look out for, etc.). For example and as will be discussed in greater detail below, the first vehicle (e.g., first vehicle 402) may at least partially block or inhibit the driver of the second vehicle (e.g., second vehicle 404) from seeing a third vehicle (e.g., third vehicle 406) in front of the first vehicle (e.g., first vehicle 402). While the above examples describe receiving a video stream from a vehicle-mounted camera system, it will be appreciated that a video stream may be received from other sources and in other configurations.

In some implementations, the data stream may be an audio stream. In some implementations, the audio stream may include a plurality of frames (e.g., frames, or timewise segments, of an audio file). In some implementations, data stream filtering process 10 may receive the audio stream from one or more audio recording devices. For example, the audio stream may include a track of music streamed from an audio recording device for playback at a client device. In some implementations, various audio tracks may be stored in a server and streamed from the server to one or more client devices. Audio streams may include audio signals or Voice-over-IP packets transmitted between participants in a conference call. It will be appreciated that various audio streams from various sources may be received within the scope of the present disclosure.

In some implementations, the data stream (e.g., data stream 300) may be encoded with metadata. Metadata may generally include data that describes the data stream (e.g., the nature of the data stream, the source of the data stream, and/or some other characteristic related to the data stream, a generator of the data stream, or the like). For example, the data stream (e.g., data stream 300) may include content encoded with metadata. The content may be the data stream (e.g., audio of an audio stream and/or video of a video stream) and the metadata may generally describe the data stream (e.g., data stream 300). In some implementations, the metadata may be specific to, and/or may correspond to, at least a portion of the data stream. For example, metadata may be encoded for each frame of a video stream and/or each audio frame of an audio stream. In some implementations, metadata may be encoded for a group or subset of frames of a video stream and/or a group and/or a subset of frames of an audio stream.

Examples of metadata may include, but are not limited to, location-based data (e.g., a GPS location) associated with a device generating the data stream (e.g., GPS location of a camera system generating a video stream and/or GPS location of an audio recording system generating an audio stream), a language associated with the data stream, the time and date each portion of the data stream was created, information relative to the source of the data stream, security permissions associated with the data stream, etc. In some implementations, the data stream (e.g., data stream 300) may include a video stream received from a camera system and the encoded metadata may include an orientation of the camera system generating the video stream, the location-based data (e.g., GPS location) where each frame was recorded, the type of camera system used to capture each frame, etc. In some implementations, the data stream may include an audio stream received from an audio recording system and the encoded metadata may include e.g., the rate at which the audio stream was recorded, the location-based data (e.g., GPS location) where each frame was recorded, etc. It will be appreciated that other types of metadata may be encoded into the data stream.

In some implementations, encoding the metadata into the data stream may generally include embedding the metadata into the data stream. For example, a source computing device may encode (e.g., via an encoder) metadata into the data stream before transmitting the data stream. An encoder may include a software and/or hardware module configured to encode or embed metadata into a data stream. In some implementations, a camera system (e.g., camera system 64) may encode metadata into the plurality of frames of a video stream while recording the video stream and/or before transmitting the video stream. In some implementations, an audio recording system may encode metadata into the plurality of frames of an audio stream while recording the audio stream and/or before transmitting the audio stream.

In some implementations, receiving 200 the data stream encoded with metadata may include decoding the metadata from the data stream. Referring again to FIG. 3, data stream filtering process 10 may receive the encoded data stream (e.g., data stream 300) at a decoder (e.g., decoder 304). A decoder may include a software and/or hardware module configured to decode or dislodge metadata from a data stream. In some implementations, the decoder may receive the encoded data stream and may output metadata (e.g., metadata 306). In some implementations, receiving 200 the encoded metadata may include providing the encoded data stream to a gate module (e.g., gate module 308) of a filtering module (e.g., filtering module 310). In some implementations, the encoded data stream may be provided to the decoder (e.g., decoder 304) and the gate module (e.g., gate module 308) at the same time or at substantially the same time. As will be discussed in greater detail below, the gate module (e.g., gate module) of the filtering module (e.g., filtering module 310) may generally include a software and/or a hardware module(s) configured to selectively filter (e.g., filter or not filter) one or more portions of a data stream (e.g., output data stream 312) by blocking or allowing the data stream to pass to a client device or other receiving device(s).

In some implementations, data stream filtering process 10 may receive 202 client data. In some implementations, client data (e.g., client data 302) may generally include data associated with a client device. A client device may generally include an electronic device (e.g., client electronic device 38) configured to access the data stream. Examples of client data may generally include location-based data (e.g., a GPS location) associated with a client device accessing the data stream (e.g., GPS location of a client device), a language associated with the client device, user input data (e.g., data associated with one or more user inputs), security clearances or permissions associated with users of the client device, job titles of users of the client device, etc.

In some implementations, client data may include a request from a client device for access to at least a portion of a data stream. For example and in some implementations, one or more data streams may be received by data stream filtering process 10. Referring also to the example of FIG. 4, the driver of the second vehicle (e.g., second vehicle 404) may desire to know if he or she can pass the leading vehicle (e.g., first vehicle 402). In some implementations, the first vehicle may provide or broadcast one or more video streams associated with one or more of a front-facing camera, a rear-facing camera, and/or a side-facing camera (e.g., camera configured to view each side of the first vehicle). In some implementations, the driver of the second vehicle may request (e.g., via an in-dash display and/or other user interface associated with a display in the second vehicle) access to the one or more data streams broadcast from the first vehicle. In some implementations, the request from the driver of the second vehicle may be received by data stream filtering process 10 in the form of client data associated with the second vehicle.

In some implementations, the request from a client device for access to at least a portion of a data stream may include a request for access to a specific data stream. For example, the driver of the second vehicle (e.g., second vehicle 404) may request access to the data stream broadcast from the first vehicle (e.g., first vehicle 402) associated with the front-facing camera and/or one or more of the side-facing cameras in response to a user action (e.g., engaging a turn signal indicator in the direction associated with one of the side-facing cameras). In this example, the engaging of the turn signal indicator in a specific direction may be received by data stream filtering process 10 as client data (e.g., client data 302) with a request for access to the data stream associated with the front-facing camera and/or one or more side-facing cameras. It will be appreciated that other user inputs may be received as client data within the scope of the present disclosure. Additionally, it will also be appreciated that no discrete or affirmative user inputs may be required.

In some implementations, one or more of the metadata encoded into the data stream and the client data may include location-based data. As discussed above, location-based data may generally include location data associated with at least a portion (e.g., one or more frames) of the data stream and/or location data of the client device. For example, location-based data associated with at least a portion of the data stream may indicate the location (e.g., GPS location) of the source of the data stream (e.g., a camera system for a video stream and/or an audio recording system for an audio stream) at the time the at least a portion of the data stream was generated. For example, a frame of a video stream may be encoded with metadata indicating the GPS location of the source of the video stream at the time the frame was generated and/or captured. In some implementations, location data of a client device may be determined (e.g., by a GPS module of a client device) periodically and may be received by data stream filtering process 10 and may indicate a location of the client device.

In some implementations, one or more of the metadata encoded into the data stream and the client data may include temporal data. Temporal data may generally include data related to time. In some implementations, the temporal data from the metadata encoded into the data stream may indicate when the data stream (e.g., at least a portion of the data stream) was generated. In some implementations, the temporal data from the client data may indicate when the client data was received from and/or generated by the client device. As will be discussed in greater detail below, the temporal data may be used to synchronize the comparison of the metadata encoded into the data stream and the client data.

In some implementations and as will be discussed in greater detail below, one or more of the metadata encoded into the data stream and the client data may include a combination of location-based data and temporal data. For example, location-based data in combination with temporal data may indicate a location (e.g., GPS location) associated with at least a portion (e.g., one or more frames) of the data stream at a given time and/or location data of the client device at a given time.

Referring again to FIG. 3 and in some implementations, data stream filtering process 10 may filter 204 at least a portion of the data stream based upon, at least in part, a comparison of the metadata encoded into the data stream and the client data. As will be discussed in greater detail below, filtering 204 at least a portion of the data stream may generally include blocking at least a portion (e.g., one or more frames) of the data stream and not filtering at least a portion of the data stream may generally include providing or outputting at least a portion (e.g., one or more frames) of the data stream. In this way, data stream filtering process 10 may selectively filter at least a portion of the data stream based upon, at least in part, the metadata encoded into the data stream and client data.

In some implementations, filtering 204 the at least a portion of the data stream may include filtering 206 one or more frames from one or more of a video stream and an audio stream. As discussed above, the data stream may include a video stream with one or more frames. Data stream filtering process 10 may selectively filter one or more frames of the video stream based upon, at least in part, the metadata encoded into the data stream and client data. In some implementations, the data stream may include an audio stream with one or more frames. Data stream filtering process 10 may selectively filter one or more frames of the audio stream based upon, at least in part, the metadata encoded into the data stream and client data.

In some implementations, filtering 204 the at least a portion of the data stream may include comparing the metadata encoded into the data stream and the client data. For example and as discussed above, data stream filtering process 10 may receive 200 a data stream encoded with metadata and decode the data stream (e.g., via decoder 304, which may separate the embedded metadata from the actual video frame) to obtain the encoded metadata (e.g., metadata 306). In response to decoding the metadata (e.g., metadata 306) from the data stream, data stream filtering process 10 may compare the metadata and the client data. Data stream filtering process 10 may compare the metadata and the client data by synchronizing the metadata (e.g., metadata 306) and the client data (e.g., client data 302) based upon, at least in part, temporal data of the metadata (e.g., metadata 306) and the client data (e.g., client data 302).

In some implementations, the metadata (e.g., metadata 306) and the client data (e.g., client data 302) may be compared via a comparison module (e.g., comparison module 314). A comparison module (e.g., comparison module 314) may generally include a software and/or a hardware module(s) configured to compare the metadata (e.g., metadata 306) decoded from a data stream to the client data (e.g., client data 302). In some implementations, data stream filtering process 10 may compare the decoded metadata (e.g., metadata 306) and the client data (e.g., client data 302) in real-time. In some implementations, the comparison of the metadata and the client data may be dynamic and/or may be completed for each portion of the data stream. In some implementations, more than one type of metadata comparison can be completed at the same time. For example and as discussed above, data stream filtering process 10 may decode various types of metadata (e.g., location-based data, temporal data, etc.) from the data stream and may receive various types of client data.

In some implementations, data stream filtering process 10 may determine 208 whether the comparison of the metadata and the client data satisfies or meets one or more conditions. The one or more conditions may generally determine 208 whether or not at least a portion of the data stream may be filtered (e.g., removed from the data stream and/or otherwise not provided to a recipient). For example, a law enforcement agency may only want to display video streams from camera systems (e.g., body camera systems, dashboard camera systems, or the like) in the correct location and with the correct orientation view a suspect (e.g., a fugitive on the run with known client device information). A media distributor may want to filter data streams from locations or client devices subject to international or local laws. A data stream provider may want to control the distribution of information in a data stream to only approved client devices (e.g., based on a role, a job title, security credentials, etc.). A see-through camera system (e.g., which may provide a view around, or on another side of, a vehicle or other obstruction) may limit its broadcast of its various cameras only to following vehicles within a certain range for at least a minimum duration of time. It will be appreciated that the one or more conditions may be specified for specific applications of data stream filtering process 10.

For example, the comparison module (e.g., via comparison module 314) may perform a check with a predefined or dynamic comparison algorithm and determines 208 a Boolean value. Returning to the example of FIG. 4 and in some implementations, the first vehicle (e.g., first vehicle 402) may transmit a video stream of what lies ahead and the following car (e.g., second vehicle 404) may receive the video stream. In some implementations, the video stream may include embedded location-based data (e.g., GPS data). Data stream filtering process 10 may receive 200 the video stream from the first vehicle (e.g., first vehicle 402) and may receive 202 the current location-based data (e.g., GPS data) from the second vehicle (e.g., second vehicle 404). In some implementations, data stream filtering process 10 (e.g., via comparison module 314) may use the predefined or dynamic comparison algorithm that returns "true" when e.g., the location-based data from each of the metadata encoded in the data stream and the client device to determine whether the one or more conditions are met (e.g., the range between the first vehicle and the second vehicle is less than or equal to 500 meters).

In some implementations, the one or more conditions may determine 206 which of one or more data streams may be filtered 204 (e.g., blocked from the output) or not filtered 208 (e.g., passed to the output). For example and in some implementations, the client data may include a request (e.g., based upon the driver engaging the traffic signal indicator to a particular direction) to access a specific data stream (e.g., a front-facing camera of the first vehicle and/or one or more side-facing cameras of the first vehicle). In some implementations, data stream filtering process 10 may determine 208 that one or more conditions associated with the front-facing camera and/or the one or more side-facing cameras are met based upon, at least in part, the client data specifying the use of the traffic signal indicator. Various additional and/or alternative conditions may also be utilized, including, but not limited to, proximity, speed, direction of travel, user/device identification, etc. In some implementations, the one or more conditions may include a combination of conditions. For example, the one or more conditions may require that the second vehicle be within e.g., 500 meters of the first vehicle and that e.g., the driver of the second vehicle engage the traffic signal indicator in a particular direction in order to pass at least a portion of the data stream (e.g., not filter the at least one portion). It will be appreciated that other combinations of conditions for filtering and/or not filtering at least a portion of the data stream are possible and within the scope of the present disclosure.

In some implementations, data stream filtering process 10 may selectively filter 204 at least a portion of the data stream based upon, at least in part, a comparison of location-based data associated with the data stream (e.g., decoded from the metadata) and location-based data from the client data. In some implementations, data stream filtering process 10 may use the real-time metadata from the data stream as a test condition against the dynamic location-based data or location-based conditions of a client device to determine whether or not to filter 204 at least a portion of the data stream. In this way, the location-based data of data stream filtering process 10 may act as flow control on the data stream. While location-based data has been discussed, it will be appreciated that other types and examples of metadata and client data may be used within the scope of the present disclosure.

Figure 5:
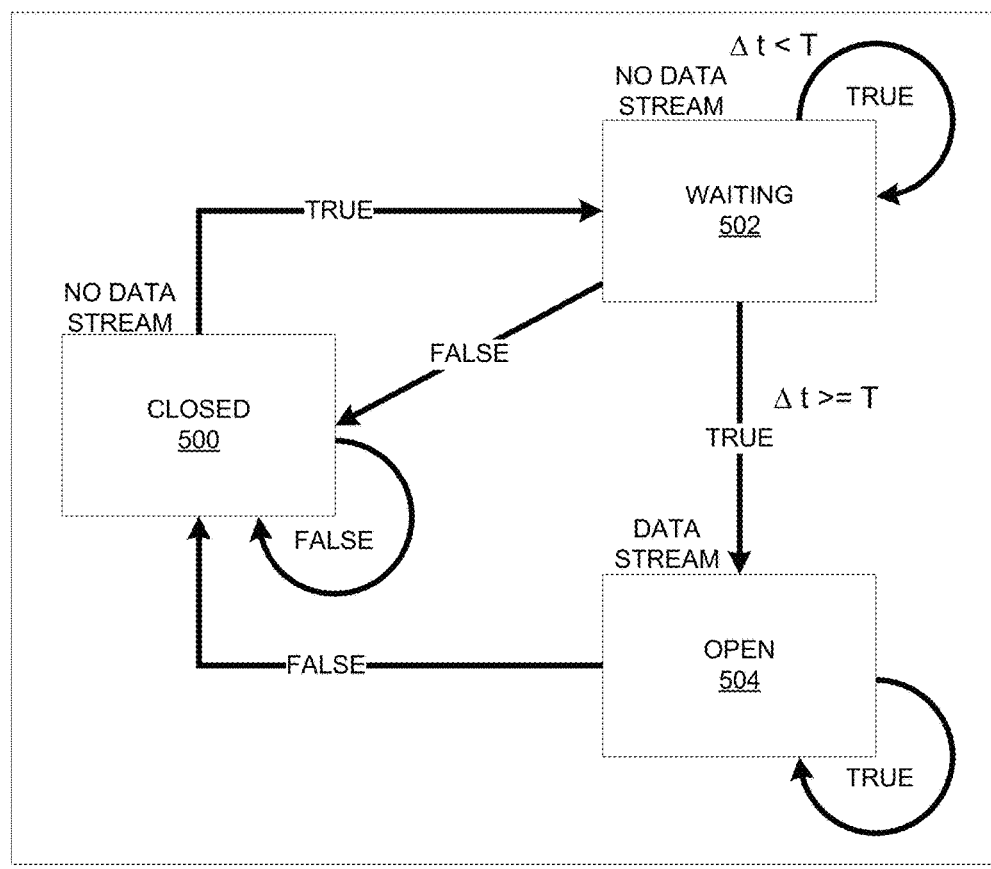
FIG. 5 is an example diagrammatic view of a state machine of the data stream filtering process of FIG. 1 according to one or more example implementations of the disclosure.

Referring also to FIG. 5 and in some implementations, data stream filtering process 10 may determine 210 whether the comparison of the metadata encoded into the data stream and the client data meets the one or more conditions for at least a minimum duration. For example, data stream filtering process 10 may filter at least a portion of the data stream if, for example, the comparison of the metadata encoded into the data stream and the client data fails to meet the one or more conditions for at least a minimum duration. In some implementations, the output of the comparison module (e.g., comparison module 314) may include a Boolean value that may be provided to a state machine (e.g., state machine 316 of filtering module 310). A state machine may generally refer to a software and/or a hardware module(s) configured to enter one of a set number of stable conditions depending on its previous condition and the present values of its inputs. As will be discussed in greater detail below, the state machine (e.g., state machine 316) may include one or more states (e.g., states 500, 502, 504) that may be configured to selectively filter at least a portion of the data stream.

For example, the state machine (e.g., state machine 316) may include at least three states: a "closed" state (e.g., closed state 500), a "waiting" state (e.g., waiting state 502), and an "open" state (e.g., open state 504). As will be discussed in greater detail below, the "open" state may generally include a state where the data stream is passed to an output (e.g., gate module 308 of filtering module 310 is open to pass the data stream to the output) and the "closed" state (e.g., closed state 500) may generally include a state where the data stream is filtered or blocked from an output (e.g., gate module 308 of filtering module 310 is closed to filter or block the data stream from the output). In some implementations, data stream filtering process 10 may be configured to initialize (e.g., upon starting data stream filtering process 10) in the "closed" state (e.g., closed state 500). In some implementations, data stream filtering process 10 may remain in the "closed" state (e.g., closed state 500) while the one or more conditions are not met (e.g., while the output of the comparison module 314 is false). Data stream filtering process 10 may be configured to enter the "waiting" state (e.g., waiting state 502) when the one or more conditions are met (e.g., when the output of comparison module 314 changes to true). In some implementations and while the one or more conditions are met (e.g., while the output of the comparison module is true), data stream filtering process 10 may remain in the "waiting" state (e.g., waiting state 502) for at least a minimum duration (e.g. a minimum number of frames, a minimum delta time, etc.). In some implementations, the minimum duration may include one or more conditions that may be met before data stream filtering process enters or transitions to the "open" state (e.g., open state 504).

In some implementations, while data stream filtering process 10 is in the "waiting" state (e.g., waiting state 502), data stream filtering process 10 may filter at least a portion of the data stream until the one or more conditions are met for at least the minimum duration. The minimum duration may be user-defined (e.g., via a user interface) and/or may include default minimum durations specific to each application of data stream filtering process 10. In some implementations, once the one or more conditions have been met for at least the minimum duration (e.g., the comparison module output remains true) data stream filtering process 10 may transition to or enter the "open" state (e.g., open state 504). In some implementations, data stream filtering process 10 may remain in the "open" state (e.g., open state 504) until the one or more conditions are no longer met (e.g., the input from the comparison module) becomes false. In some implementations and in response to the one or more conditions no longer being met (e.g., the comparison module output changes to false) while data stream filtering process 10 is in the "open" state (e.g., open state 504), data stream filtering process 10 may transition to or enter the "closed" state (e.g., closed state 500).

Returning to the above example of FIG. 4 and in some implementations, data stream filtering process 10 may output the video stream of the first vehicle (e.g., first vehicle 402) when the location-based data from each of the metadata encoded in the data stream and the client device (e.g., client device of or associated with second vehicle 404) is closer than e.g., 500 meters for a minimum duration. For example, data stream filtering process 10 may output the video stream of the first vehicle (e.g., first vehicle 402) when the location-based data from each of the metadata encoded in the data stream and the client device (e.g., client device of or associated with second vehicle 404) is closer than e.g., 500 meters for e.g., at least five seconds. In the some implementations, the minimum duration of time may output the data stream in a more stable manner. For example and in some implementations, the second vehicle (e.g., second vehicle 404) may enter the appropriate range of the first vehicle (e.g., first vehicle 402) based upon the location-based data and/or the temporal data for only e.g., two seconds before falling out of range. Data stream filtering process 10 may require that the range condition be satisfied for at least e.g., five seconds and/or e.g. 125 frames (e.g., 25 frames per second) before outputting the data stream to the second vehicle. In some implementations, data stream filtering process 10 may filter the portion of the data stream (e.g., real-time data stream) until the one or more conditions are met or satisfied for at least the minimum duration. In this way, data stream filtering process 10 may output the data stream when the one or more conditions are met or stable for effective data stream processing (e.g., output data stream 316 for displaying of a video stream, playing an audio stream, processing of data in the data stream, etc.).

Figure 6:
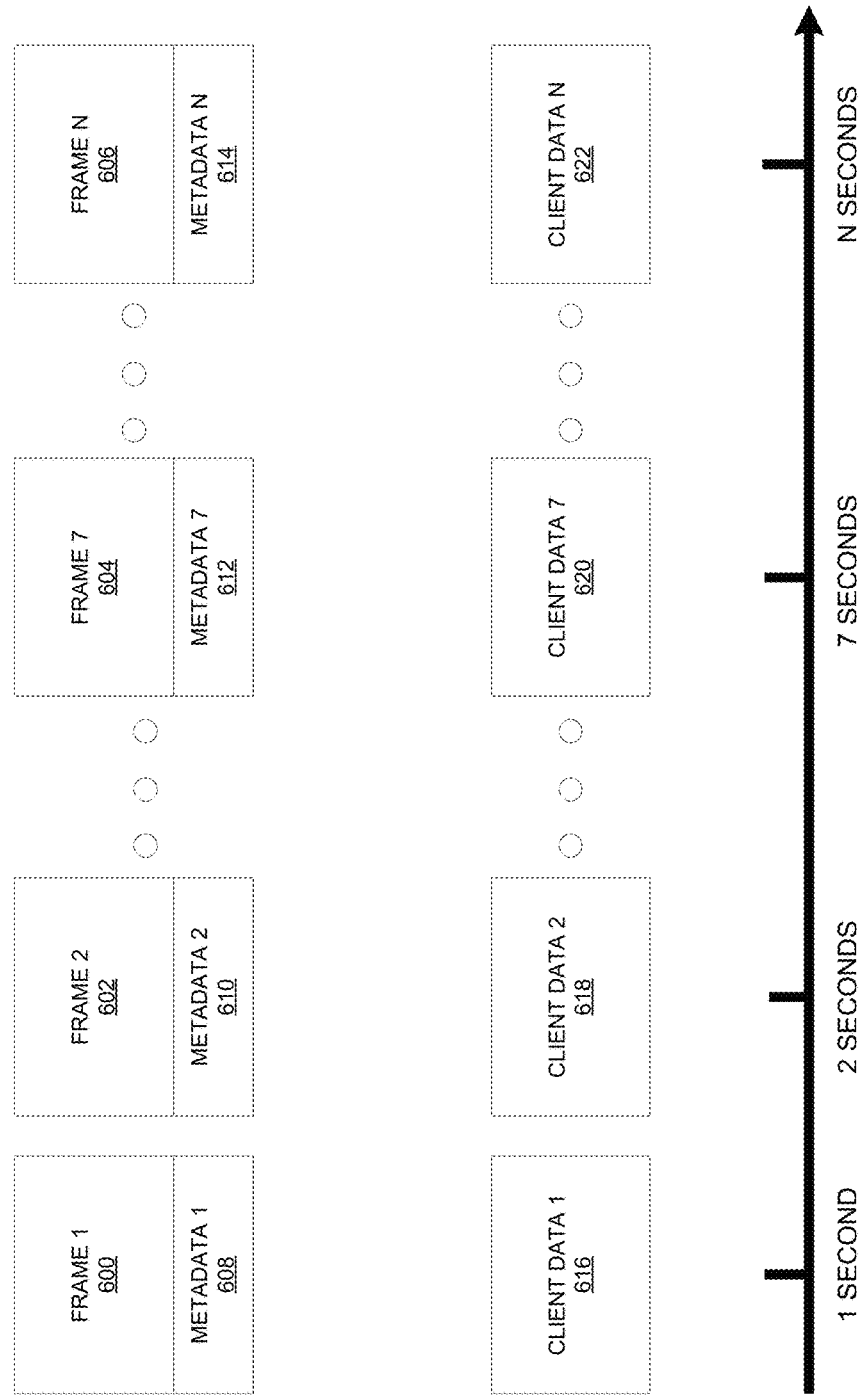
FIG. 6 is an example comparison of one or more portions of a data stream with one or more portions of client data according to one or more example implementations of the disclosure.

Referring also to FIG. 6, a data stream may be received 200 by data stream filtering process 10 and may include one or more portions (e.g., frame 1 600, frame 2 602, frame 7 604, frame N 606). The one or more portions may be encoded with metadata (e.g., metadata 1 608, metadata 2 610, metadata 7 612, metadata N 614). In some implementations, each portion of the data stream may represent e.g., a period of time of a video stream and/or an audio stream. The metadata encoded into the data stream may correspond to the period of time of the data stream (e.g., metadata corresponds to each second of the data stream). Client data may be received 202 by data stream filtering process 10 and may include one or more portions (e.g., client data 1 616, client data 2 618, client data 7 620, client data N 622) corresponding to a period of time (e.g., a portion of client data for each second). In some implementations, data stream filtering process 10 may filter 204 at least a portion of the data stream (e.g., one or more of frame 1 600, frame 2 602, frame 7 604, frame N 606) based upon, at least in part, a comparison of the metadata encoded into the data stream (e.g., metadata 1 608, metadata 2 610, metadata 7 612, metadata N 614) and the client date (e.g., client data 1 616, client data 2 618, client data 7 620, client data N 622).

Referring also to FIG. 4 and in some implementations, the data stream may include a video stream from the first vehicle (e.g., first vehicle 402). Metadata 1 (e.g., metadata 1 608) encoded into frame 1 (e.g., frame 1) of the video stream may include the location-based data of the e.g., front-facing camera system of the first vehicle (e.g., first vehicle 402) from which the video stream is generated. Client data 1 (e.g., client data 1 616) may include location-based data of the second vehicle (e.g., second vehicle 404). Data stream filtering process 10 may compare the location-based data of metadata 1 (e.g., metadata 1 608) and client data 1 (e.g., client data 1 616) to determine that one or more conditions are not met (e.g., the range between first vehicle 402 and the second vehicle 404 is not less than or equal to 500 meters). Referring also to FIG. 5, data stream filtering process 10 may remain in the "closed" state (e.g., closed state 500) because the one or more conditions are not met (e.g., output of comparison module 314 is false). Data stream filtering process 10 may filter frame 1 from the data stream based upon, at least in part, the comparison of metadata 1 (e.g., metadata 1 608) and client data 1 (e.g., client data 2 618).

In some implementations, location-based metadata from metadata 2 (e.g., metadata 2 610) encoded into frame 2 (e.g., frame 602) may be compared to client data 2 (e.g., client data 2 618. In some implementations, data stream filtering process 10 may determine that one or more conditions are met. Data stream filtering process 10 may transition to or enter "waiting" state (e.g., waiting state 502) in response to determining that the one or more conditions met. However, data stream filtering process 10 may determine that the one or more conditions (e.g., a range of less than or equal to 500 meters between vehicles) have not been met for a minimum duration (e.g., at least five seconds). Data stream filtering process 10 may remain in the "waiting" state (e.g., waiting state 502) and may filter frame 2 (e.g., frame 2 602) from the data stream (e.g., keep gate module 308 closed).

In some implementations, location-based metadata from metadata 7 (e.g., metadata 7 612) encoded into frame 7 (e.g., frame 7 604) may be compared to client data 7 (e.g., client data 7 620). In some implementations, data stream filtering process 10 may determine that one or more conditions are met and have been met since frame 2 (e.g., frame 2 602). Data stream filtering process 10 may transition to or enter the "open" state (e.g., open state 504) in response to determining that the one or more conditions met for the minimum duration (e.g., at least five seconds). Data stream filtering process 10 may not filter frame 7 (e.g., frame 7 604) from the data stream (e.g., open gate module 308) and may output frame 7 (e.g., output data stream 316) to the client device or other destination device. In some implementations, data stream filtering process 10 may not filter subsequent portions of the data stream while the one or more conditions are met for subsequent portions of the data stream. In this way, data stream filtering process 10 may selectively filter 204 at least a portion of the data stream on a frame-by-frame basis.

In some implementations, location-based metadata from metadata N (e.g., metadata N 614) encoded into frame N (e.g., frame N 606) may be compared to client data N (e.g., client data N 622). In some implementations, data stream filtering process 10 may determine that one or more conditions are no longer met (e.g., the range between the first vehicle and the second vehicle is not less than 500 meters when metadata N 614 of frame N 606 is compared to client data N 622). Data stream filtering process 10 may transition to or enter "closed" state (e.g., closed state 500) in response to determining that the one or more conditions are no longer met and data stream filtering process 10 may filter 204 frame N (e.g., frame 606) from the data stream (e.g., close gate module 308).

Figure 7:
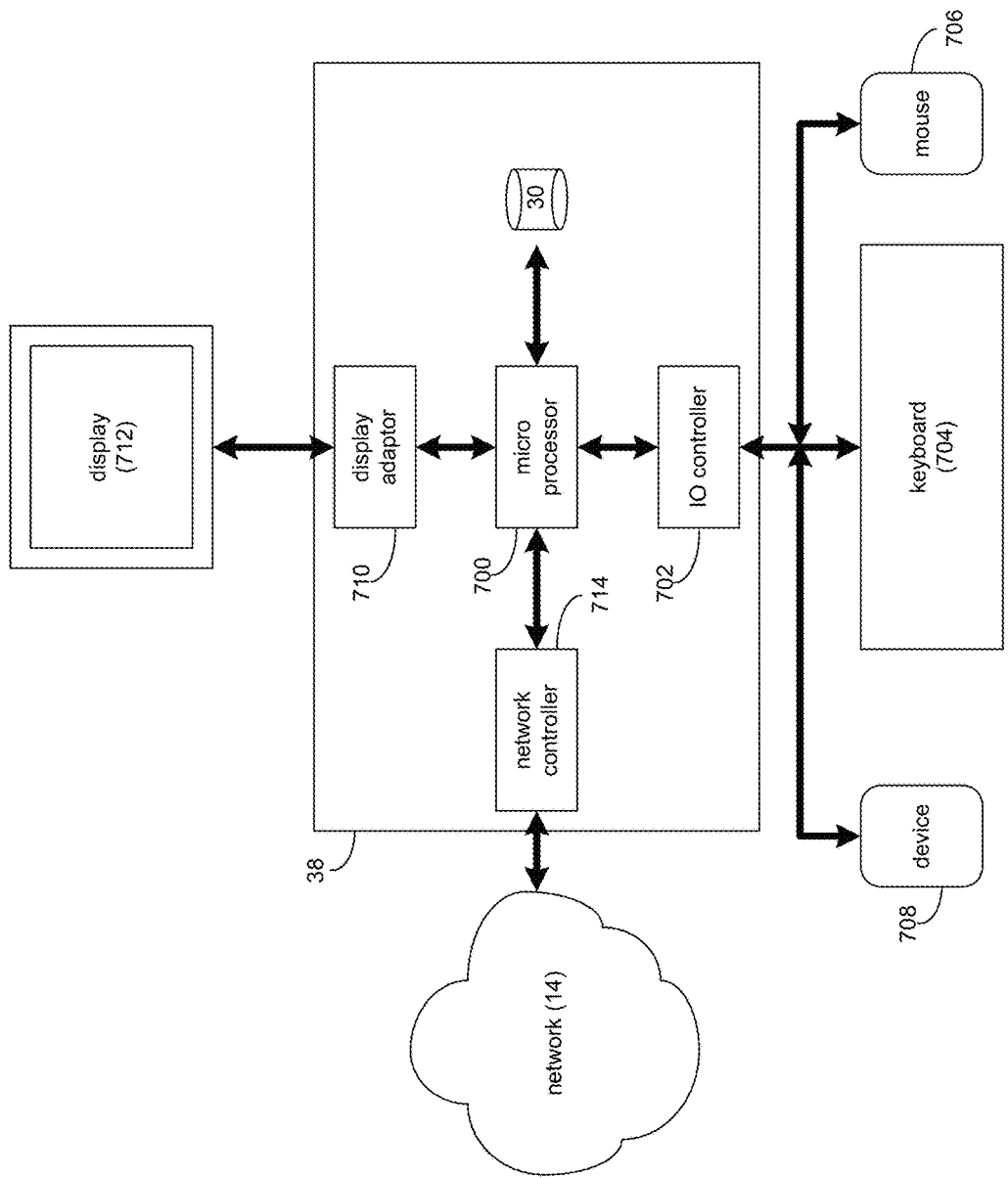
FIG. 7 is an example diagrammatic view of a client electronic device of FIG. 1 according to one or more example implementations of the disclosure.

Referring also to FIG. 7, there is shown a diagrammatic view of client electronic device 38. While client electronic device 38 is shown in this figure, this is for illustrative purposes only and is not intended to be a limitation of this disclosure, as other configurations are possible. For example, any computing device capable of executing, in whole or in part, data stream filtering process 10 may be substituted for client electronic device 38 within FIG. 7, examples of which may include but are not limited to computing device 12 and/or client electronic devices 40, 42, 44.

Client electronic device 38 may include a processor and/or microprocessor (e.g., microprocessor 700) configured to, e.g., process data and execute the above-noted code/instruction sets and subroutines. Microprocessor 700 may be coupled via a storage adaptor (not shown) to the above-noted storage device(s) (e.g., storage device 30). An I/O controller (e.g., I/O controller 702) may be configured to couple microprocessor 700 with various devices, such as keyboard 704, pointing/selecting device (e.g., mouse 706), custom device, such a microphone (e.g., device 708), USB ports (not shown), and printer ports (not shown). A display adaptor (e.g., display adaptor 710) may be configured to couple display 712 (e.g., CRT or LCD monitor(s)) with microprocessor 700, while network controller/adaptor 714 (e.g., an Ethernet adaptor) may be configured to couple microprocessor 700 to the above-noted network 14 (e.g., the Internet or a local area network).

Figure 8:
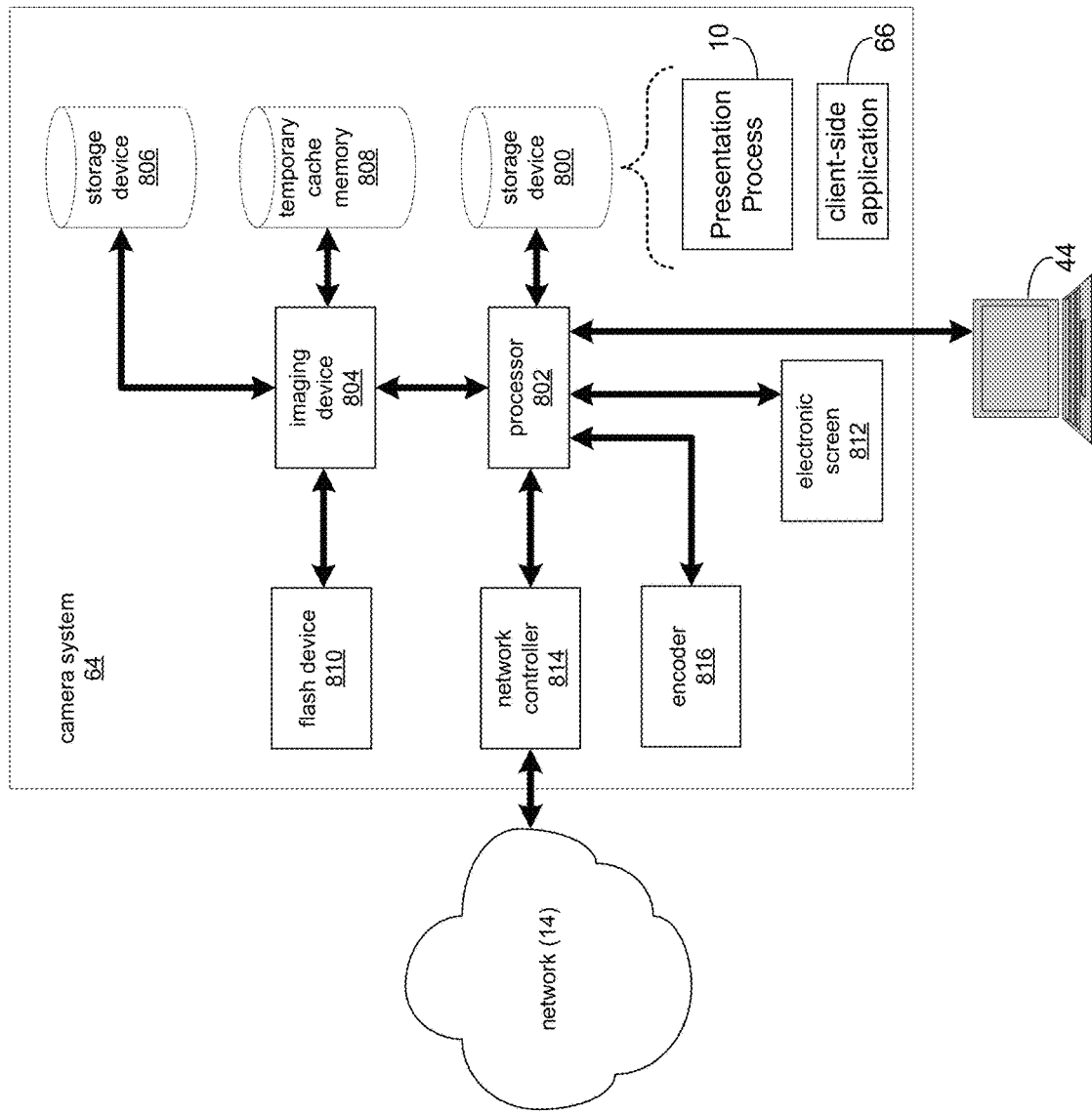
FIG. 8 is an example diagrammatic view of a camera system of FIG. 1 according to one or more example implementations of the disclosure.

Referring also to FIG. 8, there is shown a diagrammatic view of an image or video capturing device (e.g., camera system 64). Camera system 64 may include, for example, a chemical film based camera, a digital camera, a video camera, a web camera, and a camera phone. The instruction sets and subroutines of template fusion process 10, which may be stored on storage device 800 coupled to camera system 64, may be executed by one or more processors, (e.g., processor 802) and one or more memory architectures incorporated into camera system 12. Storage device 800 may include but is not limited to: a hard disk drive; a tape drive; an optical drive; a RAID array; a random access memory (RAM); a read-only memory (ROM); compact flash (CF) storage devices; secure digital (SD) storage devices; and memory stick storage devices. In some implementations, camera system 64 may be configured to be mounted to a vehicle, a structure (e.g., a wall-mounted or pole-mounted camera), an article of clothing (e.g., body camera), etc.

Camera system 64 may include imaging device 804 configured to take one or more pictures of one or more objects within a viewing field of imaging device 804. As mentioned above, camera system 64 may include, for example, a chemical film based camera, a digital camera, a video camera, a web camera and a camera phone. As such, imaging device 804 may include, but is not limited to, a chemical film based imaging device (e.g., which may be capable of capturing an image on one or more frames of chemical based photographic film, or a photographic plate), and a digital imaging device, such, but not limited to, a charge coupled device (CCD) or a complementary metal-oxide-semiconductor (CMOS) sensor capable of image capture. Imaging device 804, which may include a chemical film based imaging device and/or a digital imaging device may be configured as a video imaging device, e.g., which may be capable of capturing a sequence of still images that may be capable or representing scenes in motion.

Imaging device 804 may include a shutter mechanism and may be coupled to one or more of storage devices 806, 808 configured to store pictures taken by camera system 64. Storage device 804 may include, but is not limited to, a chemical film based storage device (e.g., including one or more frames of chemical based photographic film and/or a photographic plate), and an electronic storage device (e.g., a hard disk drive, a tape drive, an optical drive, a RAID array, a random access memory, a read only memory, compact flash (CF) storage devices, secure digital (SD) storage devices, and memory stick storage devices). Camera system 64 may include one or more lenses, an auto-focusing mechanism, and a range-finding mechanism, which may be coupled to imaging device 804. Imaging device 804 may be coupled to processor 802, and may be configured to send one or more signals to imaging device 804 for triggering imaging device 804 to take one or more pictures.

Imaging device 804 may include a flash device 810. Upon determining that a detected light level (e.g., as detected with a photocell) is below a predefined threshold light level, imaging device 804 may provide flash illumination by triggering flash device 810. When triggered, flash device 810 may provide the necessary illumination to achieve a light level equal to, or above, the predefined threshold light level. Once properly illuminated, imaging device 804 may take one or more pictures of an object illuminated by flash device 810.

Camera system 64 may include electronic screen 812. Electronic screen 812 may be a display screen used as a view finder or for displaying the viewing field of the camera. Camera system 64 may generate a live preview of the viewing field of camera system 64 by means of continuously and directly projecting the image formed by the lens of camera system 64 onto a main image sensor that feeds electronic screen 812 with the live preview image of the viewing field of the camera. Electronic screen 812 may be a liquid crystal display (LCD) or an electronic viewfinder. Additionally, network controller/adaptor 814 (e.g., an Ethernet adaptor) may be configured to couple processor 802 to the above-noted network 14 (e.g., the Internet or a local area network). In some implementations, processor 802 may include one or more 10 ports to directly connect (e.g., via a cable) to a computing device (e.g., client device 44). Once connected to a computing device, template fusion process 10 may import or otherwise receive the plurality of images from camera system 64. As discussed above, camera system 64 may include an encoder configured to encode metadata (e.g., GPS location data, temporal data, etc.) into a video stream recorded by the camera system.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to best explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method performed by a following moving vehicle, the method comprising:

receiving a video stream from a leading moving vehicle, wherein each frame of the video stream is encoded with metadata comprising the current location of the leading moving vehicle by a forward-facing camera at the leading moving vehicle, and wherein the forward-facing camera captures what lies ahead of the leading moving vehicle;

decoding the metadata from each frame of the video stream;

receiving client data comprising the current location of the following moving vehicle;

performing a real-time frame-by-frame comparison of the decoded metadata and the client data by a state machine of the following moving vehicle to determine whether the current distance between the leading moving vehicle and the following moving vehicle is less than a threshold distance for at least a minimum duration of at least two frames;

displaying the video stream to a driver of the following moving vehicle while the current distance between the leading moving vehicle and the following moving vehicle is determined to be less than the threshold distance for at least the minimum duration; and blocking the video stream from being displayed to the driver while the current distance between the leading moving vehicle and the following moving vehicle is determined to be not less than the threshold distance for at least the minimum duration.

2. The computer-implemented method of claim 1, wherein the metadata encoded into each frame further comprises a time at which the frame was generated and/or captured; and wherein the client data comprises a current time.

3. The computer-implemented method of claim 1, wherein the video stream is included in a data stream that also includes an audio stream.

4. The computer-implemented method of claim 1, further comprising:

requesting, by the following moving vehicle, a second video stream from the leading moving vehicle, the second video stream encoded by a side-facing camera at the leading moving vehicle, wherein the side-facing camera captures what lies to a first side of the leading moving vehicle;

receiving, by the following moving vehicle, the second video stream;

determining, by the state machine, whether metadata encoded into the second video stream meets one or more conditions for at least a minimum duration of at least two frames;

displaying the second video stream to the driver of the following moving vehicle while the metadata is determined to meet the one or more conditions for at least the minimum duration; and blocking the second video stream from being displayed to the driver while the metadata is determined to not meet the one or more conditions for at least the minimum duration.

5. The computer-implemented method of claim 1, wherein:

the state machine comprises a closed state, a waking state, and an open state;

the state machine remains in the waiting state at least the minimum duration after the one or more conditions are met;

the state machine blocks the video stream from an output of the following moving vehicle during the closed state; and the state machine passes the video stream to the output of the following moving vehicle during the open state.

6. A computer program product comprising a non-transitory computer readable storage medium having a plurality of instructions stored thereon, which, when executed by a processor, cause the processor to perform operations comprising:

receiving a video stream from a leading moving vehicle, wherein each frame of the video stream is encoded with metadata comprising the current location of the leading moving vehicle by a forward-facing camera at the leading moving vehicle, and wherein the forward-facing camera captures what lies ahead of the leading moving vehicle;

decoding the metadata from each frame of the video stream;

receiving client data comprising the current location of the following moving vehicle;

performing a real-time frame-by-frame comparison of the decoded metadata and the client data by a state machine of the following moving vehicle to determine whether the current distance between the leading moving vehicle and the following moving vehicle is less than a threshold distance for at least a minimum duration of at least two frames;

displaying the video stream to a driver of the following moving vehicle while the current distance between the leading moving vehicle and the following moving vehicle is determined to be less than the threshold distance for at least the minimum duration; and blocking the video stream from being displayed to the driver while the current distance between the leading moving vehicle and the following moving vehicle is determined to be not less than the threshold distance for at least the minimum duration.

7. The computer program product of claim 6, wherein the metadata encoded into each frame further comprises a time at which the frame was generated and/or captured; and wherein the client data comprises a current time.

8. The computer program product of claim 6, wherein the video stream is included in a data stream that also includes an audio stream.

9. A computing system including one or more processors and one or more memories configured to perform operations comprising:

receiving a video stream from a leading moving vehicle, wherein each frame of the video stream is encoded with metadata comprising the current location of the leading moving vehicle by a forward-facing camera at the leading moving vehicle, and wherein the forward-facing camera captures what lies ahead of the leading moving vehicle;

decoding the metadata from each frame of the video stream;

receiving client data comprising the current location of the following moving vehicle;

performing a real-time frame-by-frame comparison of the decoded metadata and the client data by a state machine of the following moving vehicle to determine whether the current distance between the leading moving vehicle and the following moving vehicle is less than a threshold distance for at least a minimum duration of at least two frames displaying the video stream to a driver of the following moving vehicle while the current distance between the leading moving vehicle and the following moving vehicle is determined to be less than the threshold distance for at least the minimum duration; and blocking the video stream from being displayed to the driver while the current distance between the leading moving vehicle and the following moving vehicle is determined to be not less than the threshold distance for at least the minimum duration.

10. The computing system of claim 9, wherein the metadata encoded into each frame further comprises a time at which the frame was generated and/or captured; and wherein the client data comprises a current time.

11. The computing system of claim 9, wherein the video stream is included in a data stream that also includes an audio stream.

* * * * *